United States Patent [19]

Heitman et al.

[11] Patent Number: 5,102,031

[45] Date of Patent: Apr. 7, 1992

[54] METHOD FOR DEPOSITING BRAZE ALLOY TO BASE METAL SURFACES USING ELECTRIC DISCHARGE PROCESS

[75] Inventors: Peter W. Heitman, Indianapolis; Stephen N. Hammond, Brownsburg; Lawrence E. Brown, Indianapolis; Elizabeth J. Holmes, Camby, all of Ind.

[73] Assignee: General Motors Corporation, Detroit, Mich.

[21] Appl. No.: 666,981

[22] Filed: Mar. 11, 1991

[51] Int. Cl.$^5$ ............... B23K 31/02; B21K 3/00
[52] U.S. Cl. ............... 228/175; 228/208; 228/263.13; 228/254; 219/76.13
[58] Field of Search ............ 228/253, 254, 263.13, 228/208, 225, 28, 226, 175; 219/76.13, 85.1, 85.22; 427/383.7, 383.9; 29/889.61, 889.7, 889.72, 889, 889.21

[56] References Cited

U.S. PATENT DOCUMENTS 3,088,192  5/1963  Turner .................... 228/263.13
4,405,851  9/1983  Sheldon .................... 219/76.13
4,507,264  3/1985  Stein ...................... 228/263.13
4,551,603 11/1985  Rocklin .................... 219/76.13
4,649,086  3/1987  Johnson ..................... 428/627

FOREIGN PATENT DOCUMENTS 1288799  5/1962  France .................... 228/253

*Primary Examiner*—Richard K. Seidel
*Assistant Examiner*—Jeanne M. Elpel
*Attorney, Agent, or Firm*—George A. Grove; Domenica N. S. Hartman

[57] ABSTRACT

Braze filler alloy is specifically applied and metallurgically bonded to a desired region of a nickel based superalloy workpiece using an electrospark deposition technique. The braze filler alloy is deposited onto, and concurrently metallurgically alloyed into, the desired region of the base metal by transfer of the material from the electrode using a short duration electrical impulse. The time and energy involved are small enough that total heat input to the base metal is minimal so that distortion and metallurgical structure changes of the base metal are negligible.

10 Claims, 1 Drawing Sheet

METHOD FOR DEPOSITING BRAZE ALLOY TO BASE METAL SURFACES USING ELECTRIC DISCHARGE PROCESS

This invention generally relates to brazing methods for use with nickel based superalloys. More particularly, this invention relates to the specific and permanent application of the braze alloy to the base metal by electrospark deposition methods.

BACKGROUND OF THE INVENTION

Nickel and iron based superalloys are regularly employed in jet engine components because of their excellent physical and mechanical properties, particularly at elevated temperatures. For example, it is not uncommon for a turbine blade within a jet engine to be exposed to operating temperatures near or even above 2000° F. Therefore, it is essential at these harsh operating conditions that these materials have exceptional strength as well as excellent corrosion resistance. To achieve these desired characteristics, these superalloys are alloyed with aluminum and titanium. In addition to strengthening the nickel and iron based alloys, these alloying elements form tenacious oxides on the surface of the component which provide the material with the necessary oxidation protection.

Brazing is a common manufacturing procedure used to join two or more surfaces. Brazing is used routinely to join individual components made from these nickel and iron based superalloys for formation of more complex jet engine assemblies. Generally, these materials are brazed together by providing an appropriate braze alloy between the mating surfaces and then heating the materials to a temperature sufficient to melt the braze alloy without melting the surrounding metals. The braze alloy melts at a lower temperature because it typically contains a melting point suppressant, such as boron. As the melting point suppressant diffuses away from the brazed region into the base metal, the remaining braze metal solidifies at the brazing temperature. The resulting structure is characterized by a permanent metallurgical bond between the braze alloy and surrounding materials.

Unfortunately there are inherent difficulties associated with the brazing methods used to join superalloy materials. Although the protective aluminum and titanium oxides within the superalloys are necessary for oxidation resistance, they become a hindrance during brazing of the superalloys. These oxides prevent the braze filler alloy from sufficiently wetting the surface of the surrounding material. Therefore, the braze filler alloy does not sufficiently flow onto the surrounding material. This impedes uniform and complete brazing between the two surfaces.

As a solution to this problem, the regions of the superalloy material which are to be brazed, are nickel plated prior to the brazing operation. This is accomplished by first appropriately masking the superalloy component, and then electrochemically plating nickel onto those regions which are to be brazed and which have not been masked. The nickel plating improves the brazeability of the superalloys by preventing oxide formation in those regions which are to be bonded, thereby enhancing the wetting action of the braze alloy. However, there are shortcomings associated with the nickel electroplating process of these materials.

Nickel plating is unduly time consuming and expensive as it necessitates several additional processing steps for the masking, plating and subsequent baking operations required. Further, these problems are magnified when the plated component is complex in shape and geometry, thereby making it extremely difficult to mask the desired areas. Consequently if the nickel plated region or mask are faulty, the resulting brazed joint between mating parts may be defective. Therefore there is a strong need for a brazing means for these superalloys which does not require the surface of the superalloy to be first nickel plated.

In addition, conventional methods for applying the braze filler alloy to the desired region to be brazed are to use a slurry paste, foil or wire form of the braze alloy. The braze alloy is applied to the desired region and the components are assembled. However during assembly of the components, the bond between the braze alloy and surrounding materials is minimal since it is based primarily on the surface tension between the materials, thereby making dislodgment of the braze alloy a possibility. This is particularly troublesome when assembling jet engine components where dimensional tolerances are frequently within the thousandths of an inch. Therefore, it would be advantageous if the braze alloy could be specifically and permanently applied to the superalloy material prior to assembly of the components.

Accordingly, what is needed is a means for brazing these superalloys wherein the braze filler alloy can be specifically applied and metallurgically bonded to the desired region of the base metal prior to the brazing operation, so as to alleviate the need for nickel plating techniques.

SUMMARY OF THE INVENTION

It is an object of this invention to provide a means for permanently applying braze filler alloy to specific, predetermined regions of the base metal surface prior to the actual brazing operation, particularly where the base metal is a nickel-base superalloy.

It is a further object of this invention that such a means for placement of the braze filler alloy use electrodeposition techniques, in particular electrospark deposition techniques, whereby a metallurgical bond is formed at the braze filler metal/base metal interface upon deposition of the braze filler alloy onto the base metal.

In accordance with a preferred embodiment of this invention, these and other objects and advantages are accomplished as follows.

Braze filler alloy is specifically applied and metallurgically bonded to a desired region of a base metal using an electrospark deposition technique. Mating components, each being formed from the base metal and having the electrospark deposited braze alloy, are then conventionally brazed together.

The base metal is preferably formed from a nickel-base alloy which is suitable for high temperature use. The base metal is electrically connected to the negative lead of a rectified alternating current electrical power source.

An electrode is provided which is formed from the desired braze filler alloy, preferably a nickel-base braze alloy. The electrode is electrically connected in parallel to a capacitor charging circuit and positively connected to the AC source of electrical power.

The braze filler alloy is deposited onto, and concurrently metallurgically alloyed into, the desired region of the base metal by transfer of the material from the electrode using a short duration electrical impulse. A capacitor is charged using the rectified AC power source and then discharged through the electrode by the firing of an independently triggered thyristor. Although the spark that is generated is of a short duration, it has sufficient energy to melt a portion of the electrode causing it to be accelerated through the arc formed between the negatively charged base metal and the positively charged electrode, and to thereby be deposited onto the base metal. Upon contact, the deposited braze filler metal alloys with the substrate forming a fully dense metallurgical bond. The time and energy involved are small enough that total heat input to the base metal is minimal so that distortion and metallurgical structure changes of the base metal are negligible and further, the chemical composition of the deposited braze filler is unchanged because the dilution with the base metal is also negligible. Electrode sparking occurs at frequencies ranging from about 200 Hz to 1200 Hz as the electrode oscillates or rotates on the base metal to form the deposit of braze filler metal at the desired joint location.

The brazed joint is then conventionally formed between the base metal component having the metallurgically bonded braze filler alloy, and the same metallurgically bonded braze filler alloy provided on the mating component.

With this method, there is great flexibility associated with the type of braze filler metal to be deposited and the base metal used. An inventive feature of this method is that the braze filler alloy is specifically applied to desired regions without the need for laborious masking and nickel plating techniques. The electrode made from the braze filler alloy can be manipulated manually or mechanically, allowing for complete control over the deposition of the braze filler metal to the base metal. In addition, upon contact between the deposited braze filler alloy and the base metal, a permanent metallurgical bond is formed between the metals.

In an alternative embodiment, a layer of nickel can be first deposited using this electrospark deposition method to specific regions of the base metal. Then the braze alloy can be applied using the electrospark deposition method or conventionally onto the nickel deposited regions. This eliminates the conventional, electrochemical nickel plating process and its associated shortcomings. This is particularly advantageous when the components to be brazed together are complex in shape.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

We are the first to permanently deposit braze filler alloy to specific regions of a nickel based alloy component using an electrospark deposition technique, so that the braze alloy and nickel-based base metal are metallurgically bonded prior to the actual brazing operation. Mating components, each having the metallurgically bonded layer of braze alloy which has been deposited using the electrospark deposition method, are then conventionally brazed together.

Figure 1:
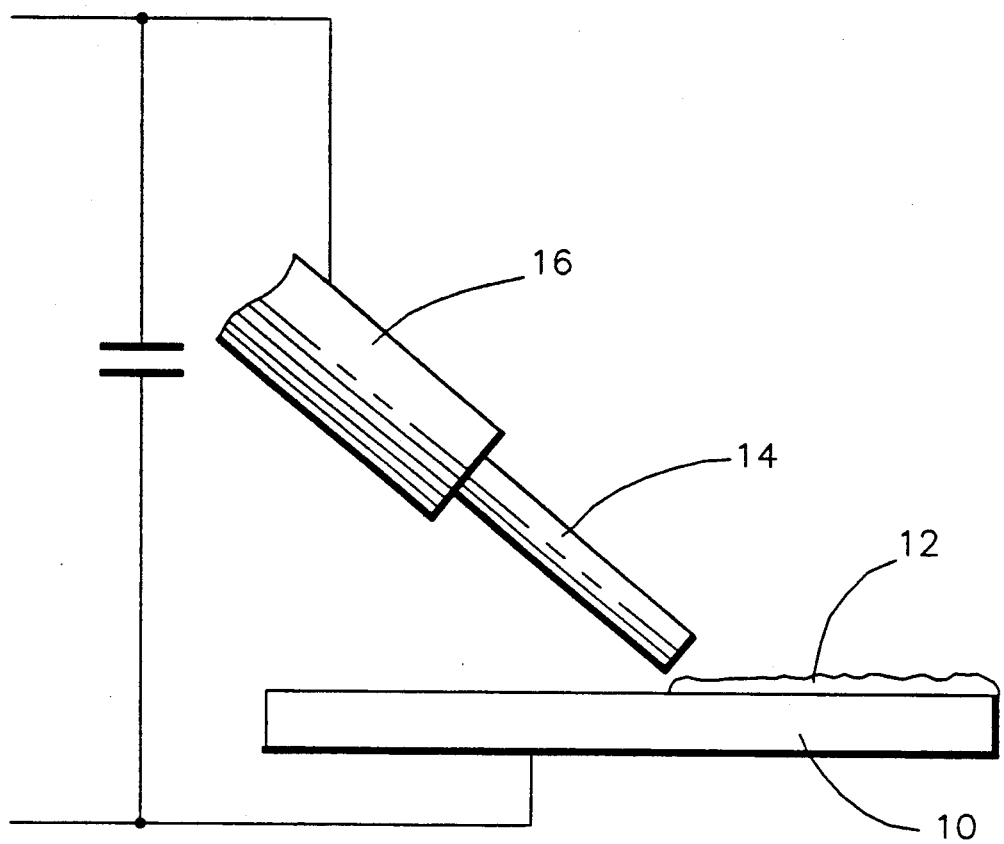
FIG. 1 is a schematic view showing the electrode formed from the braze alloy, electrode holder, base metal and deposited braze alloy, and their electrical connection in accordance with a preferred embodiment of this invention.

As shown schematically in FIG. 1, an electrode 14 formed from the desired braze alloy is retained within a holder 16, and electrically connected to the workpiece 10 formed from the desired base metal, preferably a nickel-based superalloy. The electrode 14 is charged positively and the workpiece 10 is charged negatively for deposition of material.

The braze filler alloy (depicted as layer 12) is deposited onto, and alloyed into, the desired region of the base metal workpiece 10 by transfer of the braze alloy from the electrode 14 using a short duration electrical impulse. A capacitor is conventionally charged using a rectified alternating current power source (not shown) and then discharged through the electrode 14 by the firing of an independently triggered thyristor. The electrode is preferably electrically connected in parallel to the capacitor charging circuit to achieve these results. However, alternative means for accomplishing the discharge of the capacitor are known in the art and can be used.

The spark that is generated by the discharge is of a short duration, yet it has sufficient energy to melt a portion of the braze alloy electrode 14 causing it to be accelerated through the arc formed between the negatively charged base metal 10 and the positively charged electrode 14. The melted portion of the braze alloy electrode 14 is thereby deposited onto the base metal workpiece 10. Upon contact, the deposited braze metal 12 joins to the base metal substrate 10 so as to form a fully dense metallurgical bond between the metals. The time and energy involved during the deposition process are relatively small, so that total heat input to the base metal 10 is minimal. Therefore, distortion and metallurgical structure changes of the base metal workpiece 10 are negligible. This is a particularly advantageous feature of this invention.

Frequency rates varying between about 200 Hz to about 1500 Hz for the discharging of the capacitor which is used to generate the sparking, and corresponding melting, of the braze alloy electrode material 14. It has been determined that this range of frequencies provides sufficient energy into the electrode 14 so as to melt the material, but also allows sufficient control over the material deposition rate.

Deposition of the braze alloy electrode 14 occurs as the electrode 14 contacts the base metal workpiece 10 and the capacitive circuit is concurrently discharged. The electrode 14 is manually or mechanically moved along the desired region of the workpiece 10 while the simultaneous and continual discharging occurs. As depicted in FIG. 1, the deposited layer 12 of braze alloy has only been formed on a portion of the surface of the base metal workpiece 10. This method facilitates the production of any desired length or configuration of deposited braze alloy 12.

With this method, braze alloy 12 is only deposited at the desired regions where contact is made between the electrode 14 and workpiece 10. It has been determined that deposition of the electrode material 14 occurs more smoothly if the electrode 14 is simultaneously oscillated or rotated while contacting the base metal 10. This prevents sticking of the electrode 14 to the base metal 10 when the melted portion of the electrode 14 is deposited.

Figure 2:
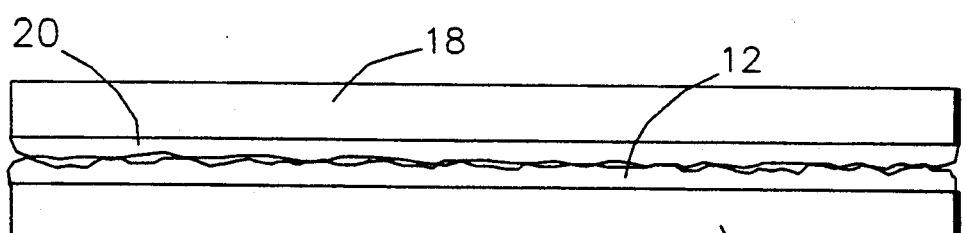
FIG. 2 is a cross-sectional view, prior to brazing, showing the base metal component having the braze alloy metallurgically bonded thereto and the mating component also having the braze alloy metallurgically bonded thereto.

As shown cross-sectionally in FIG. 2 and prior to the brazing operation, a first layer of braze alloy 12 has been deposited onto the base metal component 10. With this method, the layer of braze alloy 12 is metallurgically bonded to the base metal 10. The surface of the braze alloy layer 12 is typically not smooth, as shown, due to the nature of this deposition process wherein the electrode 14 is moved along the length of the desired brazed joint. Individual fillets are formed each time the electrical circuit is discharged through the electrode and the small amount of electrode material is melted. If a smooth layer of braze alloy 12 is required, the layer 12 can be appropriately machined or polished after deposition.

The mating component 18, which is preferably the same or a similar nickel-based material as the base metal component 10, also has on its mating surface a layer of braze alloy 20 which is metallurgically bonded to it and which has been deposited using this method. This second layer of braze alloy 20 contacts the first layer of braze alloy 12, and is aligned prior to brazing. The mating parts 10 and 18 are then brazed together at a temperature and for a duration known in the art. Alternatively, additional braze filler metal could be applied at the edge of the joint using conventional methods. This additional braze alloy will provide sufficient material to complete the fill of the joint and prevent voids from occurring due to mismatch of the contacting surfaces caused by the roughness of the layer of braze alloy applied using the electrospark deposition method. However, this is not absolutely necessary.

It is noted that for simplicity, the first base metal 10 and mating component 18 are shown as being two flat surfaces. However, in practice, the components which are to be joined by brazing may be any shape that is manufactureable and assembleable. An advantage of this method is that the braze alloy layer 12 or 20 can be applied almost anywhere on any shape component and is limited only by the accessibility of the braze alloy electrode 14 (as shown in FIG. 1) to the desired region, thereby permitting a great degree of flexibility during assembly of these components. In addition, since a metallurgical bond is formed between the braze alloy layer 12 or 20 and base metal 10 or 18 upon contact, there is no possibility of dislodgment during assembly.

During brazing, the mating layers of braze alloy 12 and 20 melt at a temperature lower than the melting point of the surrounding materials 10 and 18. Upon melting, each layer of braze alloy 12 and 20 flows and sufficiently commingles to form a uniform, high density metallurgical bond with each other. Since each layer of braze alloy 12 and 20 is metallurgically bonded to their corresponding base metal components, 10 and 18 respectively, prior to the brazing operation, there is no unwanted movement of the braze alloy 12 and 20 during assembly or brazing. In addition, the formation of oxides in each base metal component 10 and 18 is suppressed during brazing because the underlying base metal superalloy material is not exposed to the atmosphere due to the presence of each corresponding layer of braze alloy 12 and 20.

Figure 3:
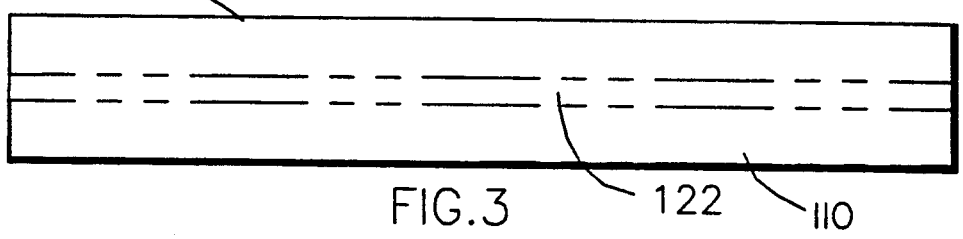
FIG. 3 is a cross-sectional view showing the assembly of FIG. 2 after brazing.

Shown in FIG. 3 is a cross-sectional view showing the joined assembly of FIG. 2 after brazing. The first and second layers of braze alloy (12 and 20 in FIG. 2) are no longer discernible as two distinct layers, but rather have formed a single brazed joint 122 intermediate between and metallurgically bonded to the mating base metal components 110 and 118. The braze joint 122 consists primarily of the braze material, however at the bonded region between the braze joint 122 and each base metal component 110 and 118, there is a diffusion zone corresponding to where the braze alloy has metallurgically alloyed with each base metal. This region is depicted by the phantom lines in FIG. 3.

It is foreseeable that suitable results would be obtained if only one base metal component had the metallurgically bonded braze alloy layer deposited onto it. The mating component, if formed from a superalloy material, would require the conventional nickel plated protective layer before brazing. The nickel plated region of the mating component would contact the metallurgically bonded braze alloy which has been deposited to the first base metal component using this method. However, it is believed that the simplicity and efficiency of this method would dissuade one from using the conventional nickel plating methods, particularly in light of its above mentioned disadvantages.

It is also foreseeable that one may choose to apply the braze alloy conventionally to the desired region of the mating components, but first apply the nickel or braze alloy layer using this method. The application of the nickel or braze alloy layer to the specific regions of the components using this method, would avoid the shortcomings of the electrochemical nickel plating process and its associated masking techniques.

The components may be formed from any base metal which can be brazed. Examples of suitable base metal materials are not only the iron and nickel base superalloys, but also stainless steels, iron alloys, mechanical alloy materials, and titanium alloys. Our results have been directed to the use of various commercially available nickel based superalloys which are suitable for high temperature use, although it is expected that satisfactory results would be achieved with any of the above listed materials. Their material designation names and elemental compositions (in nominal weight percentages) are as follows:

IN792: 0.21% C, 12.7% Cr, 9% Co, 2% Mo, 3.9% W, 4.2% Ti, 3.2% Al, 0.02% B, 0.1% Zr and balance Ni, which is a cast material available from International Nickel Corporation;

MarM247: 0.16% C, 8.2% Cr, 10% Co, 0.6% Mo, 10% W, 1% Ti, 5.5% Al, 0.02% B, 0.09% Zr, 3% Ta and balance Ni, which is a cast material available from Martin Metals Corporation;

C1023: 0.15% C, 15.5% Cr, 10% Co, 8% Mo, 3.6% Ti, 4.2% Al, 0.006% B, 0.5% Fe and balance Ni, which is a cast material available from Cannon Muskegon Corporation; and WASPALLOY: 0.08% C, 19.5% Cr, 13.5% Co, 4.3% Mo, 3.0% Ti, 1.3% Al, 0.006% B, 0.06% Zr and balance Ni, which is a commercially available wrought material designated by the Aerospace Materials Specification AMS 5704.

The braze alloy was successfully deposited onto components formed from these four nickel based superalloys using the electrospark deposition method of this invention. These materials were then successfully brazed together also.

The braze alloy utilized may be any electrically conductive material that can be formed into an electrode and that is compatible with the base metal to be brazed. The braze alloy must be able to conduct and discharge the electrical charge of the capacitive charging circuit, which is used to melt the braze alloy electrode so as to deposit the braze alloy material onto the base metal. Suitable braze alloy materials include not only nickel and nickel based braze alloys, but also copper, silver, aluminum, gold, other precious metals such as palladium, and alloys formed from these materials. Practically speaking, it is foreseeable that almost any braze alloy could be first deposited using this method.

A commercially available, nickel based material having the Aerospace Materials Specification AMS 4777 was chosen as the braze alloy to be used with the above base metals. Braze alloy AMS 4777 has an elemental composition (in nominal weight percentages) as follows: 4.5% Si, 7.0% Cr, 3.1% B, 3.0% Fe and the balance nickel. Braze alloy AMS 4777 was chosen because of its wide use in the aerospace industry. Therefore, it was determined that if satisfactory results could be obtained with this method using the AMS 4777 braze alloy, satisfactory results could be obtained with other braze alloys as well.

The AMS 4777 braze alloy was successfully applied using the method of this invention to a pair of mating components formed from each of the four base metals; IN792, MarM247, C1023 and WASPALLOY. AMS 4777 braze alloy has a melting temperature of about 1000° C. The four pairs of components were brazed at a temperature sufficient to melt the AMS 4777 braze alloy, but insufficient to melt the nickel based base metals, which melt generally at a temperature of about 1100° C. or slightly higher. The resulting braze joints exhibited high quality, dense metallurgical bonds with a diffusion zone in the base metal as normally results from brazing but no additional changes to the microstructure. In fact, the crystal structure of the base metal was unaffected by the deposition of the braze metal using this method. The brazed joints formed with the applied braze alloy in accordance with this invention were comparable or better than braze joints formed from conventionally applied AMS 4777 braze alloy using the electroplated nickel on these materials.

The preferred process parameters employed for the deposition of AMS 4777 braze alloy to all four of the superalloy materials is as follows. First the surfaces to be joined by brazing are cleaned thoroughly, such as by grinding or machining to remove gross debris followed by grit blasting to remove any other foreign matter. The surfaces then should be wiped with acetone or any other traditional cleaning solvent.

The electrodes used to metallurgically bond the braze alloy AMS 4777 to the superalloy components were formed from the AMS 4777 material and were 0.186" in diameter and 2.0" long for the oscillating type of electrode holder, and 0.125" in diameter and 2.0" long for a rotating type of electrode holder.

The superalloy components were then coated using this technique. Argon gas was flowed over the part to be brazed, at a rate sufficient to shield the braze region from unwanted oxidation or exposure to the atmosphere. In practice, the argon was flowed at about 10 cubic feet per hour and the region to be deposited with the braze alloy was purged with the argon gas for about 30 seconds prior to deposition to ensure good metallurgical bonds between the materials. Any other commercially available inert gas could also be used to shield the region during the braze alloy deposition process. The electrode motion was then begun, either oscillating or rotating, depending on the torch type holder, and the capacitor was charged. The workpiece was touched with the electrode with a pressure equivalent to what would be used for coloring with a wax crayon. The electrode was then moved along the superalloy component applying an even line of braze alloy from the electrode arcing. Preferably, overlapping passes are made with the electrode until the entire surface is uniformly covered with the braze alloy. The electrode angle should be at about a 45 degree angle with the workpiece during the deposition process.

The capacitance value employed was about 20 microfarads and the frequency was about 200 Hz. A short circuit voltage of about 100 volts and a short circuit current of about 1 Ampere was used. These parameters may be varied within reasonable limitations, however these values resulted in high quality metallurgically bonded layers of braze alloy to the base metal components. The particulars of the electrospark deposition method used are similar to the teachings of U.S. Pat. No. 4,405,851 to Sheldon entitled "Apparatus for Transfer of Metallic Materials by Electric Discharge".

In addition, conventionally applied AMS 4777 braze alloy was used in conjunction with a commercially pure nickel layer which was deposited using these same process parameters, to mating components formed from each of the four base metals; IN792, MarM247, C1023 and WASPALLOY. The nickel layer replaced the conventional electrochemically deposited nickel plate layer. The AMS 4777 braze alloy exhibited good wetting characteristics over the various materials, surfaces and again, the resulting brazed joints were comparable to conventionally formed brazed joints having an electroplated layer of nickel.

The brazed joints were formed between the base metal component having the metallurgically bonded braze filler alloy, and the mating component having the same metallurgically bonded braze alloy, using conventional brazing thermal cycles and in some instances an additional amount of conventionally applied braze alloy, which are known within the art.

With this method, there is great flexibility associated with the type of braze filler metal to be deposited and the base metal used. An inventive feature of this method is that the braze filler alloy is specifically applied to desired regions without the need for laborious masking and nickel plating techniques. The electrode made from the braze filler alloy can be manipulated manually or mechanically, allowing for complete control over the deposition of the braze filler metal to the base metal. In addition, upon contact between the deposited braze filler alloy and the base metal, a permanent metallurgical bond is formed between the metals, thereby avoiding many of the shortcomings associated with conventional methods for applying braze alloy and its associated use of nickel electroplating.

While our invention has been described in terms of preferred embodiments, it is apparent that other forms of this method could be adopted by one skilled in the art, such as by substituting other base metals or braze alloys, or by modifying the electrical circuitry or hook-up. Accordingly, the scope of our invention is to be limited only by the following claims.

The embodiments of this invention in which an exclusive property or privilege are claimed is as follows:

1. A method for brazing together two surfaces comprising the following steps:
   providing a first electrical conductor which is formed from a nickel based alloy and which has a braze region on a first surface;
   providing an electrode formed from a metallurgically appropriate braze alloy;
   discharge leads to a capacitive charging circuit, said positive lead being directly connected to said electrode and said negative lead operably connected to said first electrical conductor;
   depositing said braze alloy onto said braze region of said first electrical conductor by transferring said braze alloy material from said electrode to said braze surface by discharging said capacitive charging circuit upon contact between said first electrical conductor and said electrode;
   moving said electrode within said braze region and repeating and depositing step as necessary to sufficiently cover said braze region with said braze alloy;
   providing a second article formed from said nickel based alloy which is to be brazed at a second surface to said first surface at said braze region, and which contacts said deposited braze alloy at said braze region; and
   heating said braze alloy to a temperature and for a duration sufficient to melt said braze alloy but insufficient to substantially melt said nickel based alloy, so as to form a metallurgical bond between said braze alloy and said first and second surfaces.

2. A method for brazing together two surfaces as recited in claim 1 wherein said braze alloy is a nickel based alloy.

3. A method for brazing together two surfaces as recited in claim 1 wherein said second article has at its second surface a layer of said braze alloy which has been deposited similarly to the manner in which said braze alloy was deposited to said first electrical conductor.

4. A method, for brazing together two surfaces as recited in claim 1 further comprising the step of applying a suitable additional amount of said braze alloy, prior to said step of contacting said electro-deposited braze alloy at said braze region by said second article.

5. A method for brazing together two surfaces comprising the following steps:
   providing a first electrical conductor which is formed from a nickel based alloy and which has a braze region on a first surface;
   providing an electrode formed from a metallurgically appropriate braze alloy;
   operably connecting positive and negative discharge leads to a capacitive charging circuit, said positive lead being directly connected to said electrode and said negative lead operably connected to said first electrical conductor;
   depositing said braze alloy onto said braze region of said first electrical conductor by transferring said braze alloy material from said electrode to said braze surface by discharging said capacitive charging circuit upon contact between said first electrical conductor and said electrode;
   providing a second article formed from a nickel based alloy which is to be brazed at a second surface to said first surface at said braze region of said first electrical conductor, wherein said braze alloy is deposited to said second surface of said second article in a manner similar to said method used to deposit said braze alloy onto said first electrical conductor;
   contacting said braze alloy on said braze region of said first electrical conductor and said braze alloy of said second surface of said second article; and
   heating said braze alloy to a temperature and for a duration sufficient to melt said braze alloy but insufficient to substantially melt said nickel based alloys, so as to form a metallurgical bond between said braze alloy and said first and second surfaces.

6. A method for brazing together two surfaces as recited in claim 5 further comprising the step of flowing an amount of inert gas over said regions to be brazed while said braze alloy is being deposited, which is sufficient to prevent exposure to the atmosphere by said surfaces.

7. A method for brazing together two surfaces as recited in claim 5 further comprising the step of applying a suitable additional amount of said braze alloy, prior to said step of contacting said electro-deposited braze alloy at said braze region by said second article.

8. A method for brazing together two surfaces comprising the following steps:
   providing a first electrical conductor which is formed from a nickel-based alloy and which has a braze region on a first surface;
   providing an electrode consisting essentially of nickel;
   operably connecting positive and negative discharge leads to a capacitive charging circuit, said positive lead being directly connected to said electrode and said negative lead operably connected to said first electrical conductor;
   depositing said nickel onto said braze region of said first electrical conductor by transfer from said electrode to said braze surface by discharging said capacitive charging circuit upon contact between said first electrical conductor and said electrode;
   moving said electrode within said braze region and repeating said depositing step as necessary to sufficiently cover said braze region with said nickel;
   depositing a metallurgically appropriate braze alloy on the nickel deposit in said braze region;
   providing a second article formed from said nickel-based alloy which is to be brazed at a second surface to said first surface at said braze region, and which contacts said deposited braze alloy at said braze region; and
   heating said braze alloy to a temperature and for a duration sufficient to melt said braze alloy but insufficient to substantially melt said nickel-based alloy, so as to form a metallurgical bond between said braze alloy and said first and second surfaces.

9. A method for brazing together two surfaces as recited in claim 8 wherein said braze alloy is a nickel-based alloy.

10. A method for brazing together two surfaces as recited in claim 8 wherein said nickel is deposited to the braze region on both said first surface and second surface and said braze alloy is deposited on said nickel deposits by an electrical discharge process like that used to deposit said nickel to said surfaces.

* * * * *